United States Patent
Lei et al.

(10) Patent No.: US 11,416,498 B2
(45) Date of Patent: Aug. 16, 2022

(54) METHOD, ELECTRONIC DEVICE, AND COMPUTER PROGRAM PRODUCT FOR DATA STREAM PROCESSING

(71) Applicant: EMC IP Holding Company LLC, Hopkinton, MA (US)

(72) Inventors: Lu Lei, Shanghai (CN); Frank Yifan Huang, Shanghai (CN); Julius Jian Zhu, Shanghai (CN); Yu Teng, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/125,696

(22) Filed: Dec. 17, 2020

(65) Prior Publication Data

US 2022/0138205 A1    May 5, 2022

(30) Foreign Application Priority Data

Oct. 30, 2020    (CN) .......................... 202011194753.2

(51) Int. Cl.
*G06F 16/2455* (2019.01)
*G06F 16/28* (2019.01)
*G06F 16/248* (2019.01)
*G06F 16/2457* (2019.01)

(52) U.S. Cl.
CPC ...... *G06F 16/24568* (2019.01); *G06F 16/248* (2019.01); *G06F 16/24573* (2019.01); *G06F 16/288* (2019.01)

(58) Field of Classification Search
CPC ......... G06F 16/24568; G06F 16/24573; G06F 16/288

USPC ........................................................ 707/769
See application file for complete search history.

(56) References Cited

U.S. PATENT DOCUMENTS

| | | | |
|---|---|---|---|
| 7,545,986 B2* | 6/2009 | Bachmann | G06V 20/13 382/224 |
| 8,393,540 B2* | 3/2013 | Alleshouse | G06K 15/1813 235/462.15 |
| 11,017,688 B1* | 5/2021 | Arazi | G16H 20/60 |
| 2001/0007570 A1* | 7/2001 | Mangin | H04Q 11/0478 370/476 |
| 2010/0242120 A1* | 9/2010 | Anderson | G06Q 50/26 726/27 |
| 2018/0150694 A1* | 5/2018 | Guttmann | G06N 5/04 |
| 2018/0150695 A1* | 5/2018 | Guttmann | G06V 20/30 |
| 2021/0117868 A1* | 4/2021 | Sriharsha | G06F 16/2246 |

* cited by examiner

*Primary Examiner* — Dung K Chau
(74) *Attorney, Agent, or Firm* — Amin, Turocy & Watson, LLP

(57) ABSTRACT

Data stream processing is performed. For instance, a method includes: in response to a query request on an input data stream, determining data labels for input data items in the input data stream, the data labels at least indicating a first matching relationship between the input data items and a first query condition of the query request; determining an output data stream corresponding to the input data stream, the output data stream including output data items corresponding to the input data items, and each output data item having a data label; and determining query information corresponding to the query request based on the output data stream. In this way, it is possible to respond to real-time query requests for data streams.

20 Claims, 7 Drawing Sheets

METHOD, ELECTRONIC DEVICE, AND COMPUTER PROGRAM PRODUCT FOR DATA STREAM PROCESSING

RELATED APPLICATION

The present application claims the benefit of priority to Chinese Patent Application No. 202011194753.2, filed on Oct. 30, 2020, which application is hereby incorporated into the present application by reference herein in its entirety.

TECHNICAL FIELD

Embodiments of the present disclosure relate to the field of computers, and more particularly, to a method, an electronic device, and a computer program product for data stream processing.

BACKGROUND

In the field of big data analysis, it is a new trend to use data stream processing to replace traditional batch-based data processing. In certain application scenarios, data streams are required to be processed with extremely low delay, so as to obtain corresponding query results for the specific continuous query. However, currently available systems cannot respond to complex continuous query requests.

SUMMARY

The embodiments of the present disclosure provide a solution for data stream processing.

In a first aspect of the present disclosure, a method for data stream processing is provided, which includes: in response to a query request on an input data stream, determining data labels for input data items in the input data stream, the data labels at least indicating a first matching relationship between the input data items and a first query condition of the query request; determining an output data stream corresponding to the input data stream, the output data stream including output data items corresponding to the input data items, and each output data item having a data label; and determining query information corresponding to the query request based on the output data stream.

In a second aspect of the present disclosure, an electronic device is provided, which includes a processor; and a memory coupled to the processor and having instructions stored therein, wherein the instructions, when executed by the processor, cause the electronic device to execute actions, and the actions include: in response to a query request on an input data stream, determining data labels for input data items in the input data stream, the data labels at least indicating a first matching relationship between the input data items and a first query condition of the query request; determining an output data stream corresponding to the input data stream, the output data stream including output data items corresponding to the input data items, and each output data item having a data label; and determining query information corresponding to the query request based on the output data stream.

In a third aspect of the present disclosure, a computer program product is provided. The computer program product is tangibly stored on a computer-readable medium and includes machine-executable instructions. The machine-executable instructions, when executed, cause a machine to perform any steps of the method according to the first aspect.

The Summary section is provided to introduce the selection of concepts in a simplified form, which will be further described in the Detailed Description below. The Summary section is neither intended to identify key features or main features of the present disclosure, nor intended to limit the scope of the present disclosure.

BRIEF DESCRIPTION OF THE DRAWINGS

The above and other objectives, features, and advantages of the present disclosure will become more apparent by describing example embodiments of the present disclosure in detail with reference to the accompanying drawings, and in the example embodiments of the present disclosure, the same reference numerals generally represent the same components. In the accompanying drawings.

DETAILED DESCRIPTION

Figure 1:
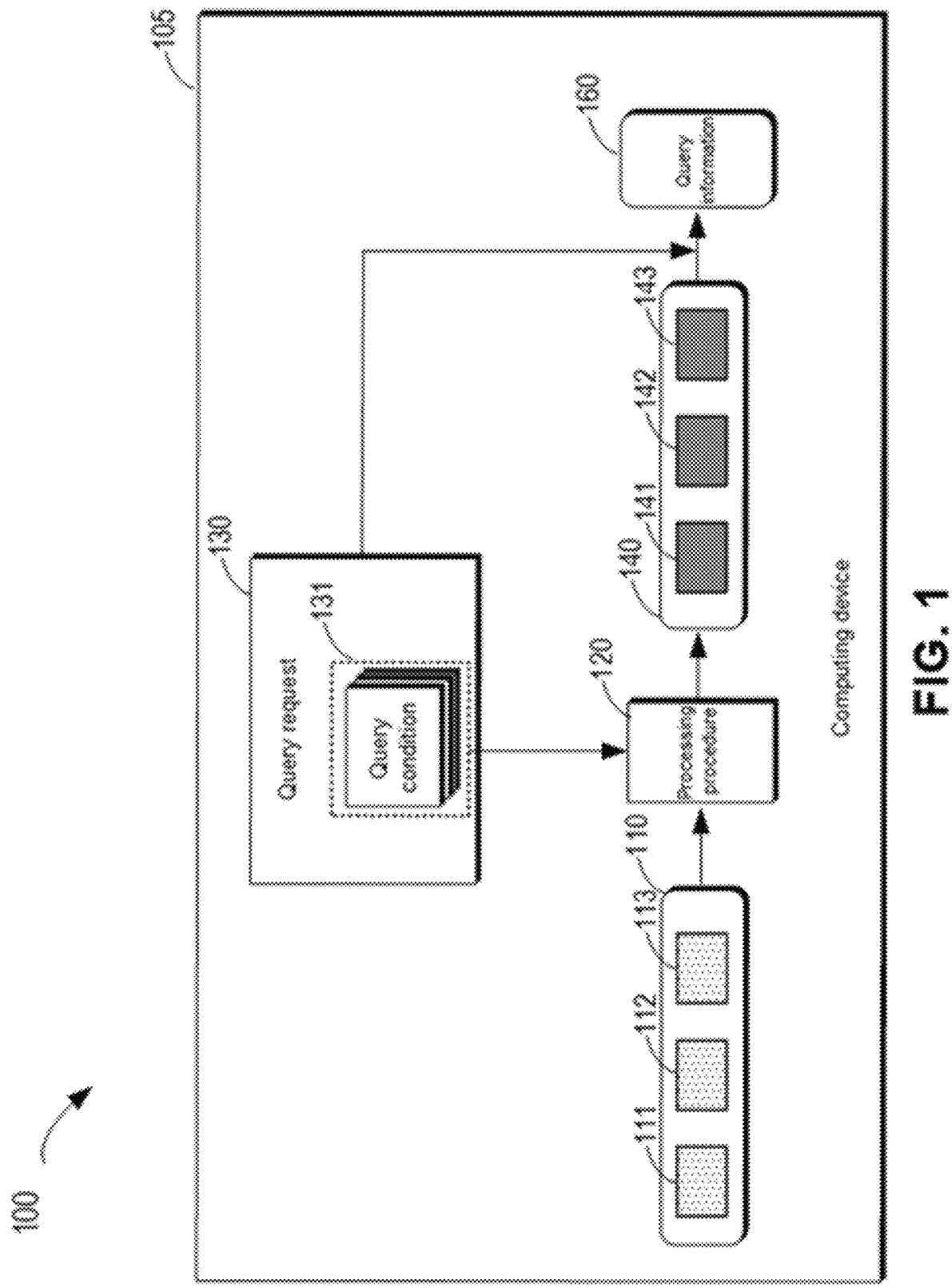
FIG. 1 shows a schematic diagram of an example environment according to an embodiment of the present disclosure.

The principles of the present disclosure will be described below with reference to some example embodiments shown in the accompanying drawings.

As used herein, the term "include" and variations thereof mean open-ended inclusion, that is, "including but not limited to." Unless specifically stated, the term "or" means "and/or." The term "based on" means "based at least in part on." The terms "an example embodiment" and "an embodiment" indicate "a group of example embodiments." The term "another embodiment" indicates "a group of additional embodiments." The terms "first," "second," etc. may refer to different or the same objects. Other explicit and implicit definitions may also be included below.

Continuous and unlimited data provides a new storage object, i.e., a data stream. The term "data stream" as used herein may refer to an ordered sequence of data items. The ordered sequence may be an infinite sequence of data items in any number. As an example, the data items may be events, and the data stream may be a sequence of any number of events that are durable, elastic, or appended-only. The data items may include fields in any number, and the fields include field names and field data. For ease of understanding, the following embodiments will be described with the data items as events, but the present disclosure is not limited thereto.

In a storage system, a data stream is divided into a group of datashards, which are usually referred to as segments. The segments act as containers for data items in the data stream.

In order to facilitate querying for the data items, a search engine in the storage system usually indexes each input data item, and stores the index in a corresponding index shard based on identification information of the data item. The index may be considered as a durable, elastic, and extensible container for indexing a data item in the storage system.

For example, it may be determined whether a specific term (for example, cat, or dog) appears in each of multiple data items (for example, files) or not, and where it appears, thereby generating tokens, and then correspondingly building the index based thereon. Storing the index of the data item in the corresponding index shard may be performed by, for example, a consistent hashing algorithm, and the identification information of the data items may form a key space. The key space is divided into multiple partitions, corresponding to the index shards, to respond to query requests for the data items.

The index built in this way can support a full-text query. For example, suppose there are Event 1 "This is a dog" and Event 2 "This is a cat," if a query condition of the full-text query is for "dog and cat," tokens "dog" and "cat" may be generated based on the query condition. Then, based on a pre-built index for Event 1 and Event 2, it can be known that the tokens exist in the index of Event 1 and Event 2, and therefore a query result for the query, i.e., Event 1 and Event 2, may be returned.

However, the query method needs to build an index of the data item in advance and obtain a query result based on the index. Therefore, it cannot support a real-time query of an input data stream. This type of query is sometimes referred to as a "historical query."

The historical query generally supports two types of queries. One is "filtering," that is, deciding whether a data item matches a specific condition or not. For each data item, the result is simply yes or no. For example, the following queries "Whether a timestamp field indicates between 2015 and 2016 or not?" and "Whether a status field is set as 'published' or not?" both can be considered as filtering.

The other one is "querying," that is deciding how well the data items match the query conditions. In addition to determining whether a data item matches a query phrase, the matched search results may be sorted according to relevance scores. The higher a score is, the more relevant the data item is.

In the historical query, each query result is obtained in response to a specific query request, and the returned result is one of the data items that have been indexed. Therefore, new data items that continuously enter the system along with the data stream cannot be queried by the historical query.

In some specific application scenarios, such as filtering, monitoring, and alarming of event logs, there is a need for a real-time query for such data items. "Continuous query" is a query that is continuously performed over time as the data items of the data stream continue to enter the storage system. The traditional continuous query usually only supports filter conditions and simple query conditions, and cannot provide complex functions such as a historical query. For example, no corresponding solution is currently provided for the complex continuous query such as a join query.

For example, considering an example given in Table 1 below, Table 1 shows webpage access events, which may be considered as a data stream.

TABLE 1

| Event ID | Server | Client IP | Domain name | Time stamp | Category |
|---|---|---|---|---|---|
| 1 | Shanghai | 10.2.26.51 | www.acc.com | 04/19/2019 09:40:12 | Phishing |
| 2 | Beijing | 10.2.26.112 | www.abc.com | 04/19/2019 10:12:57 | Virus |
| 3 | Shanghai | 10.2.26.49 | www.abc.com | 04/19/2019 10:16:25 | Virus |
| 4 | Beijing | 10.2.26.49 | www.adc.com | 04/19/2019 10:17:51 | Phishing |
| 5 | Beijing | 10.2.26.78 | mail.aaa.com | 04/19/2019 10:23:05 | Normal |
| 6 | Beijing | 10.2.26.49 | www.abc.com | 04/19/2019 10:33:17 | Virus |

As an example, only 6 events in the data stream are listed in Table 1, but it will be understood that it may include events in any number. For each event, the example of Table 1 has 6 fields and corresponding record data, but it will be understood that fields in any number may be included.

Traditionally, the website category may be filtered if malicious websites are needed to be queried for. For example, for a real-time filtering query for "At Beijing server, a client IP that has accessed virus webpages," "Server=Beijing" and "Category=Phishing" (where "=" may indicate whether data in a specific field on the left of the symbol matches a key phrase on the right of the symbol) may be set as a query condition, a continuous query request may be submitted to obtain a corresponding query result (for example, Event 4), thereby acquiring corresponding query information (for example, 10.2.26.49). For the continuous query, when the input data items of the input data stream meet the above query condition, the query information (for example, 10.2.26.49) may be notified in real time to an administrator such as an IT administrator.

As mentioned above, the traditional continuous query request does not support a complex combination. For example, in order to prevent a client IP that has accessed phishing webpages most times and also has accessed www.abc.com, a combined query request may be set to acquire such a client IP. However, since the query fields are different, a traditional continuous query method based on filtering and simple matching apparently cannot acquire the required query information.

For example, in a traditional solution, a query may be performed through the following steps: step 1, through a query request, acquiring access counts of all client IPs that have accessed phishing webpages (for the example in Table 1, the result is IP 10.2.26.49, 1 time; IP 10.2.26.51, 1 time); step 2, through another query request, acquiring access counts of all client IPs that have accessed www.abc.com (for the example in Table 1, the result is IP 10.2.26.49, 2 times; IP 10.2.26.112, 1 time); step 3, combining the two access counts based on the client IPs; and step 4, sorting the combined access counts to acquire the client IP queried for, i.e., 10.2.26.49.

In order to at least partially overcome the above shortcomings, the embodiments of the present disclosure provide a data stream processing solution for realizing a response to a complex continuous query request. According to an embodiment of the present disclosure, for a query request, when computing device 105 receives input data items of an input data stream, it determines a data label corresponding to each input data item and indicating a matching relationship between data in the input data item and a query condition; then, for each input data item, computing device 105 outputs a corresponding output data item with a data label, so that the number of the acquired data items included in the output data stream is corresponding to the number of the data items included in the input data stream. Then, the output data stream having labels may be further processed to acquire query information.

Based on such a data stream processing mechanism, since multiple output data items with data indicating the matching relationship with the query conditions, instead of some specific query results, are output, the output data stream may be continuously processed by a stream processing technology (for example, the continuous query), and thus the real-time query to complex query requests may be supported.

FIG. 1 shows a schematic diagram of example environment 100 according to an embodiment of the present disclosure. In the example environment, a device and/or a method according to an embodiment of the present disclosure may be implemented. As shown in FIG. 1, a method according to an embodiment of the present disclosure is implemented at computing device 105. Computing device 105 may receive input data stream 110, and input data stream 110 includes input data items 111, 112, and 113. It will be understood that the input data stream may include input data items in any number. Computing device 105 may receive query request 130 on input data stream 110, and query request 130 may include (multiple) query condition(s) 131.

Computing device 105 may execute processing procedure 120 corresponding to query request 130 on input data stream 110 to acquire output data stream 140. Output data stream 140 includes output data items 141, 142, and 143 corresponding to input data items 111, 112, and 113, respectively.

It will be understood that the output data stream may also include input data items in any number, but in the example, the number of data items included in the output data stream and the number of data items included in the input data stream are equal. In some other examples, the number of data items included in the output data stream may be equal to the sum of the number of data items included in the (multiple) input data stream(s).

In some embodiments, output data items 141, 142, and 143 all include data labels, and the data labels at least indicate the matching relationships between the corresponding input data items 111, 112, and 113 and query condition 131 of query request 130.

Based on the output data stream including output data items 141, 142, and 143, computing device 105 may perform further processing to acquire query information 160 corresponding to query request 130.

A process of controlling a storage system according to an embodiment of the present disclosure will be described below with reference to FIG. 2 to FIG. 8. For ease of understanding, the specific data mentioned in the following description are all examples and are not intended to limit the scope of protection of the present disclosure.

Figure 2:
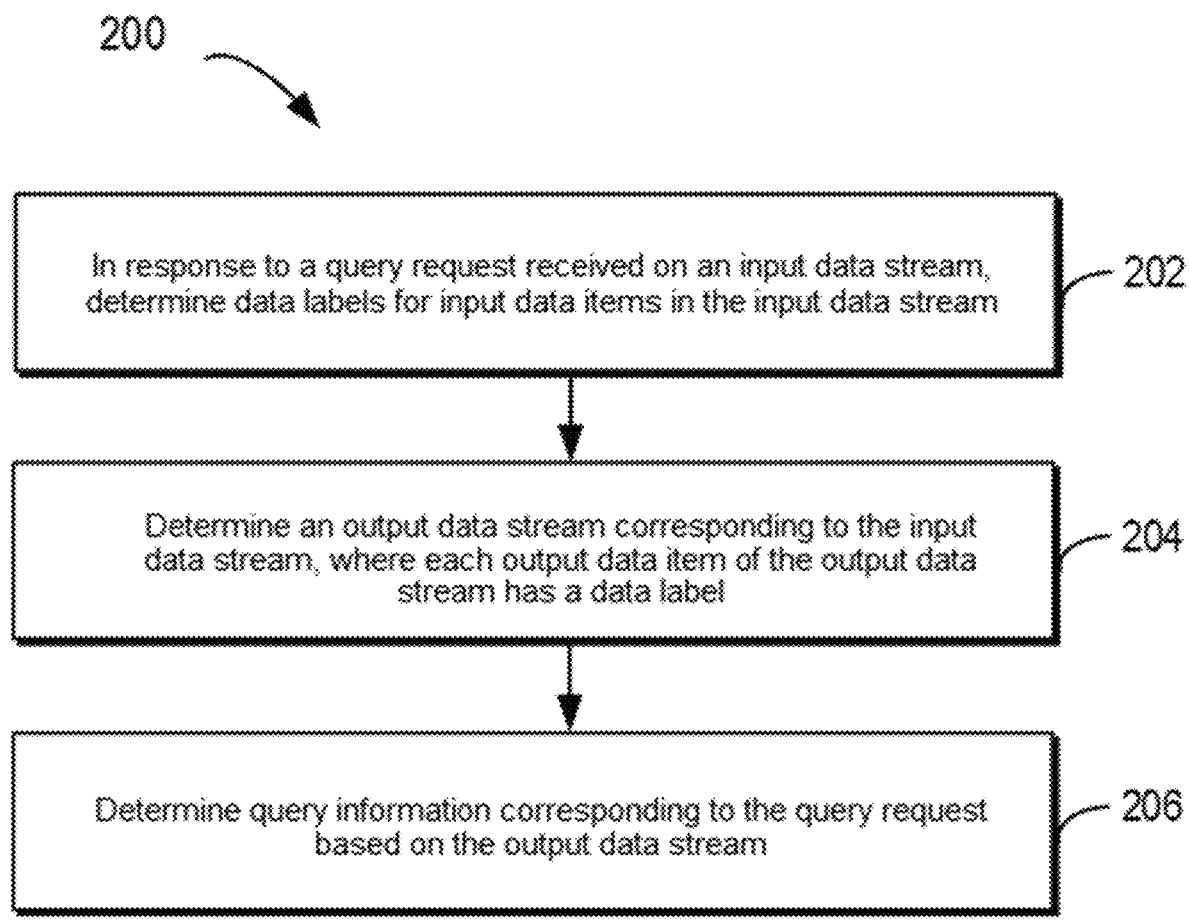
FIG. 2 is a flowchart of a process of data stream processing according to an embodiment of the present disclosure.

FIG. 2 shows a flowchart of process 200 of controlling a storage system according to an embodiment of the present disclosure. Process 200 may be implemented in computing device 105 as shown in FIG. 1. It should be understood that process 200 may also include additional actions not shown and/or omit actions shown, and the scope of the present disclosure is not limited in this regard.

At 202, computing device 105 may, in response to query request 130 for input data stream 110, determine a data label for an input data item in input data stream 110, and the data label indicates at least a first matching relationship between the input data item and first query conditions 131 of query request 130.

Specifically, the following description will be made with reference to the example given in Table 1. If query request 130 is "In webpage access events, a client IP that has accessed phishing webpages the most," then query condition 131 may be "Category=Phishing." In some embodiments, the data label may be set to be associated with query condition 131. For example, for query condition 131 "Category=Phishing," a data label may be correspondingly "Null" (that indicates a mismatch) or "Phishing" (that indicates a match). In other embodiments, the data label may be, for example, "N" or "Y," to identify the corresponding data item.

In some embodiments, query request 130 may include multiple query conditions 131, such as a first query condition and a second query condition, and computing device 105 may determine a data label associated with the first query condition.

In some embodiments, the data label associated with the first query condition may be determined as follows. First, computing device 105 may determine a first query field corresponding to query request 130. For example, for the data stream and the query condition 131 "Category=Phishing" shown in Table 1 above, it can be determined that the corresponding query field is "Category." Then, computing device 105 may acquire first record data corresponding to the first query field in the corresponding input data item. For example, for the data stream shown in Table 1 above, it may acquire that the record data corresponding to the "Category" is "Phishing" in the Event 1. Next, computing device 105 may determine a first matching relationship based on the first record data and the first query condition. For example, for Event 1 in the data stream shown in Table 1 above, a matching relationship being a match may be determined, thereby determining the data label is "Phishing"; and for Event 2 in the data stream shown in Table 1 above, a matching relationship being a mismatch may be determined, thereby determining the data label is "Null."

Additionally or alternatively, computing device 105 may determine two data labels respectively associated with the first query condition and the second query condition. One of the two data labels indicates the first matching relationship between the input data item and the first query condition, and the other data label indicates the second matching relationship between the input data item and the second query condition.

At 204, computing device 105 may determine output data stream 140 corresponding to input data stream 110, the output data stream includes output data items corresponding to the input data items, and each output data item has the data label.

In some embodiments, computing device 105 may add a determined data label to an input data item to generate an output data item. In some embodiments, computing device 105 may associate the determined data label with record data in some fields in an input data item to generate an output data item. Computing device 105 may output the generated output data item as a part of output data stream 140. It can be understood that when the number of data items in input data stream 110 is equal to the number of data items in output data stream 140, a sequence of the input data items corresponds to a sequence of the corresponding output data items.

In some embodiments, computing device 105 may process multiple query requests for multiple data streams at the same time, and output only one merged data stream. It can be understood that in this case, although the number of data items in a single input data stream 110 is not equal to the number of data items in the output data stream, the sequence of the output data items included in the output data stream may be corresponding to the sequence of processing the input data items.

In some other examples, the number of data items included in output data stream 140 may be equal to the sum of the number of data items included in (multiple) input data stream(s) 110.

At 206, computing device 105 may determine query information 160 corresponding to query request 130 based on output data stream 140.

Continuing to refer to the example given in Table 1, for query request 130 "In webpage access events, a client IP that has accessed phishing webpages the most," after the output data stream with or without the label of "Phishing" is acquired, all output data items with the label "Phishing" may be acquired by regular filtering operations, and then the filtered output data items may be subjected to regular sorting or counting, so that query information 160 (i.e., the client IP) as required may be acquired.

As discussed above, the traditional continuous query request does not support the combination of complex query conditions, due to the fact that, for the traditional continuous query request, computing device 105 only responds with query results matching the query conditions, while the query results do not include Information about data items that do not match the query conditions. For example, for a continuous query request "A client IP that has accessed phishing webpages," in a traditional solution, computing device 105 only returns a query result "10.2.26.49" and "10.2.26.51," which may not include information such as the related domain name, or information related to other events such as Events 2 and 3. The query result is not a data stream, so it is not adaptable to various data stream processing.

According to an embodiment of the present disclosure, for each input data item, computing device 105 determines a corresponding data label and uses the data label as a part of an output data item in output data stream 140. Thus, for the input data items in input data stream 110, corresponding output data items with data labels may be found in output data stream 140, and the data labels can indicate the matching relationships between the input data items and the query condition. Therefore, output data stream 140 composed of these output data items with data labels may facilitate various subsequent data stream processing (for example, a query using combined query conditions, a query on multiple input data streams 110, and traditional filtering, matching, etc.) to acquire required query information 160 for query request 130.

Based on the data stream processing mechanism, since multiple output data items with data indicating the matching relationship with the query conditions, instead of some specific query results, are output, the output data stream may be continuously processed by a stream processing technology (for example, the continuous query), and thus the real-time query to complex query requests may be supported.

Figure 3:
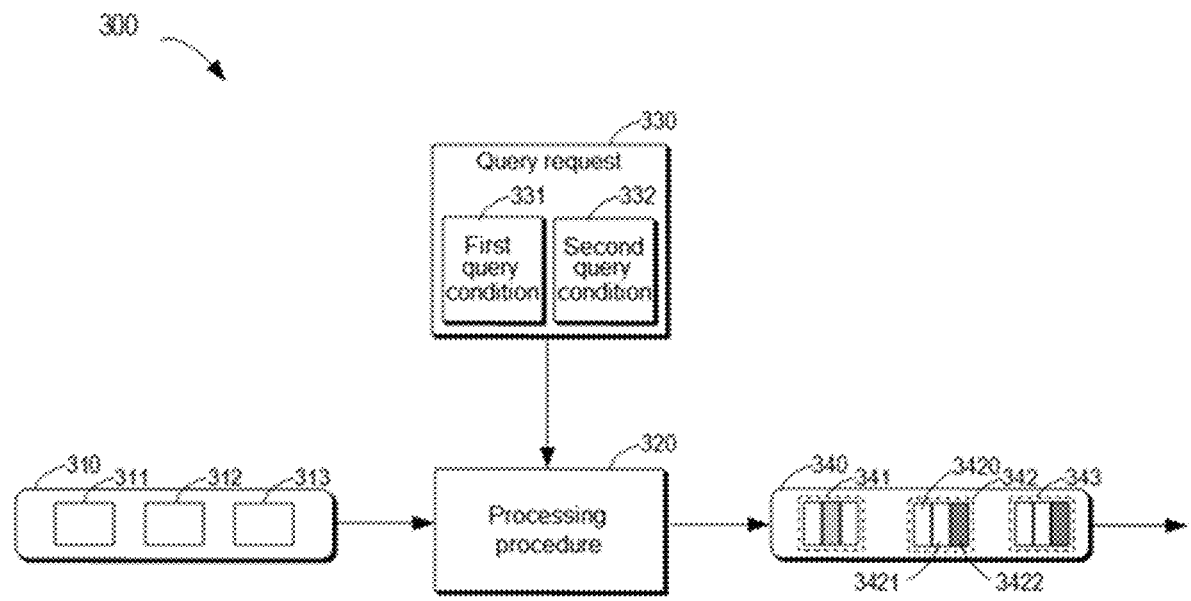
FIG. 3 shows a schematic diagram of an example process of determining data labels according to an embodiment of the present disclosure.

An example implementation of determining the data label in 202 will be described in detail below in conjunction with the data stream shown in FIG. 3 and Table 1. FIG. 3 shows a schematic diagram of an example process of determining data labels according to an embodiment of the present disclosure. Processing procedure 320 may be implemented in computing device 105 shown in FIG. 1. It will be understood that although FIG. 3 only schematically shows the processing of the first three input data items in the data stream shown in Table 1, the similar processing may be applied to other input data items.

Computing device 105 may receive input data stream 310, and input data stream 310 includes a plurality of input data items 311, 312, and 313. In other words, computing device 105 may continuously receive input data items 311, 312, and 313. In response to continuous query request 330 registered by a user such as an IT administrator, computing device 105 may execute processing procedure 320 on input data stream 310 to acquire output data stream 340, and output data stream 340 includes output data items 341, 342, and 343.

Continuing to refer to the data stream shown in Table 1 above, input data items 311, 312, and 313 may correspond to Events 1, 2, and 3 in Table 1, respectively, and query request 310 may be, for example, "In webpage events, a client IP that has accessed malicious webpages the most," therefore, query conditions included in query request 310 may be determined as: first query condition 331 "Category=Phishing" and second query condition 332 "Category=Virus." Through processing procedure 320, computing device 105 may determine corresponding data labels. For example, for input data item 312 (i.e., Event 2), through processing procedure 320, computing device 105 may determine that first data label 3421 is "Null," and second data label 3422 is "Virus."

Specifically, processing procedure 320 may include an operation for determining the first data label. The operation for determining the first data label here is similar to the operation for determining the first data label associated with the first query condition in 202 described with reference to FIG. 2, and thus, will not be repeated here.

Processing procedure 320 also includes the following operations for determining the second data label. First, computing device 105 determines second query condition 332 (for example, "Category=Virus") corresponding to query request 330 and a second query field (for example, Category), and the second query condition is different from the first query condition. Then, computing device 105 acquires second record data corresponding to a second query field in an input data item. For example, for Event 1, the second record data is Phishing. Next, computing device 105 determines a second matching relationship between the input data item and the second query condition based on the second record data and the second query condition. For example, for Event 1, the second matching relationship is a mismatch. Finally, computing device 105 determines the second data label indicating the second matching relationship, for example, for Event 1, the second data label is "Null."

In some embodiments, output data items 341, 342, and 343 may include the above data labels and record data in input data items 311, 312, and 313, and the record data is associated with the query information to be queried. Taking output data item 342 as an example, if a client IP needs to be queried for, in addition to data labels 3421 and 3422, output data item 342 may also include record data 3420, that is, "10.2.26.112."

In some embodiments, output data items 341, 342, and 343 may include the above data labels, and input data items 311, 312, and 313 per se. Taking output data item 342 as an example, in addition to the data labels 3421 and 3422, output data item 342 may further include data 3420 the same as the data of input data item 312. Thus, output data items 341, 342, and 343 included in the acquired output data stream may be expressed as <Event 1, "Phishing," Null>, <Event 2, Null, "Virus">, and <Event 3, Null, "Virus">.

It will be understood that additional data stream processing may be performed on output data stream 340, such as the data stream processing described below with reference to FIG. 6 to FIG. 8, to determine the corresponding query information. Therefore, the data stream processing method according to the embodiment of the present disclosure has better flexibility and scalability.

Figure 4:
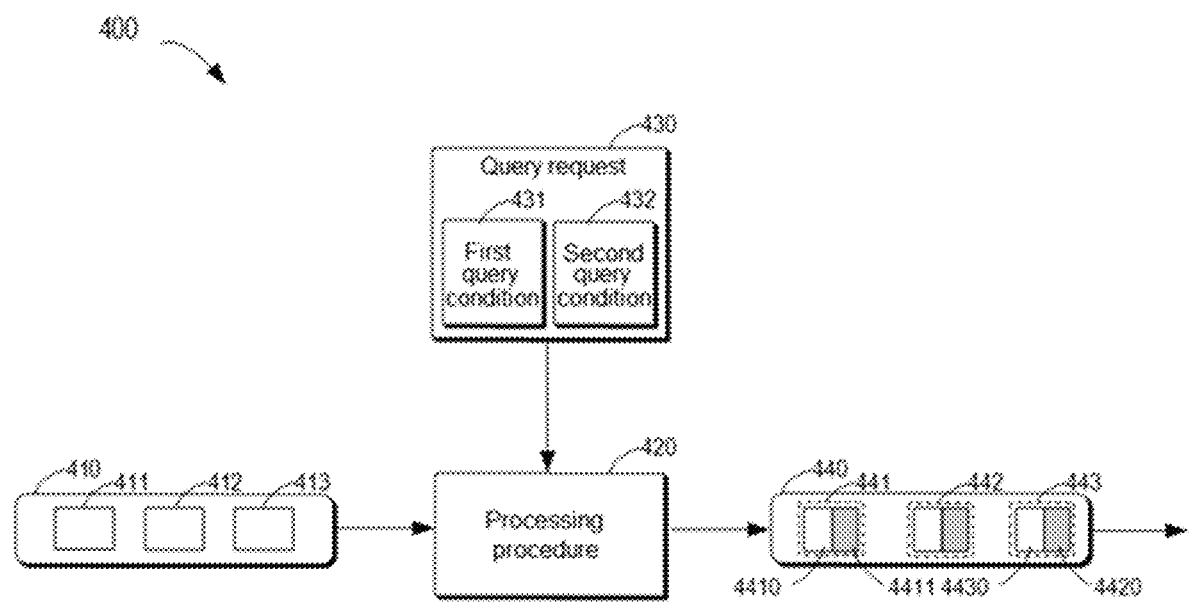
FIG. 4 shows a schematic diagram of another example process of determining data labels according to an embodiment of the present disclosure.

FIG. 4 shows a schematic diagram of another example process of determining data labels according to an embodiment of the present disclosure. Process 400 may be implemented in computing device 105 as shown in FIG. 1. Input data stream 410, input data items 411-413, query request 430, first query condition 431, and second query condition 432 in FIG. 4 are similar to the corresponding items described in FIG. 3, and accordingly will not be repeated here. The difference lies in processing procedure 420 and output data items 441, 442, and 443 included in output data stream 440.

Specifically, processing procedure 420 may determine the first matching relationship and the second matching relationship based on the process described with reference to FIG. 3. Continuing to refer to the data stream shown in Table 1 above, for input data item 411 (i.e., Event 1), the first matching relationship between the input data item and query condition 431 "Category==Phishing" is a match, and the second matching relationship between the input data item and second query condition 432 "Category==Virus" is a mismatch. For input data item 413 (i.e., Event 3), the first matching relationship between the input data item and first query condition 431 "Category==Phishing" is a mismatch, and the second matching relationship between the input data item and second query condition 432 "Category==Virus" is a match.

In some embodiments, since the corresponding query request may not need to accurately distinguish types of malicious behaviors, a data label indicating both the first matching relationship and the second matching relationship may be used, thereby simplifying subsequent processing of the output data stream. For example, for input data item 411 (i.e., Event 1), computing device 105 may determine data label 4411 indicating the first matching relationship and the second matching relationship, that is, "Malicious." Therefore, output data item 441 may include data label 4411 and data 4410 the same as the data of input data item 411. For input data item 413 (i.e., Event 3), computing device 105 may determine data label 4431 indicating the first matching relationship and the second matching relationship, that is, "Malicious." Therefore, output data item 443 may include data label 4413 and data 4430 the same as the data of input data item 413. Thus, output data items 441, 442, and 443 included in the acquired output data stream may be expressed as <Event 1, "Malicious">, <Event 2, "Malicious">, and <Event 3, "Malicious">, respectively.

It will be understood that additional data stream processing may be performed on output data stream 440, such as the data stream processing described below with reference to FIG. 6 to FIG. 8, to determine corresponding query information. Therefore, the data stream processing method according to the embodiment of the present disclosure has good flexibility and scalability.

Figure 5:
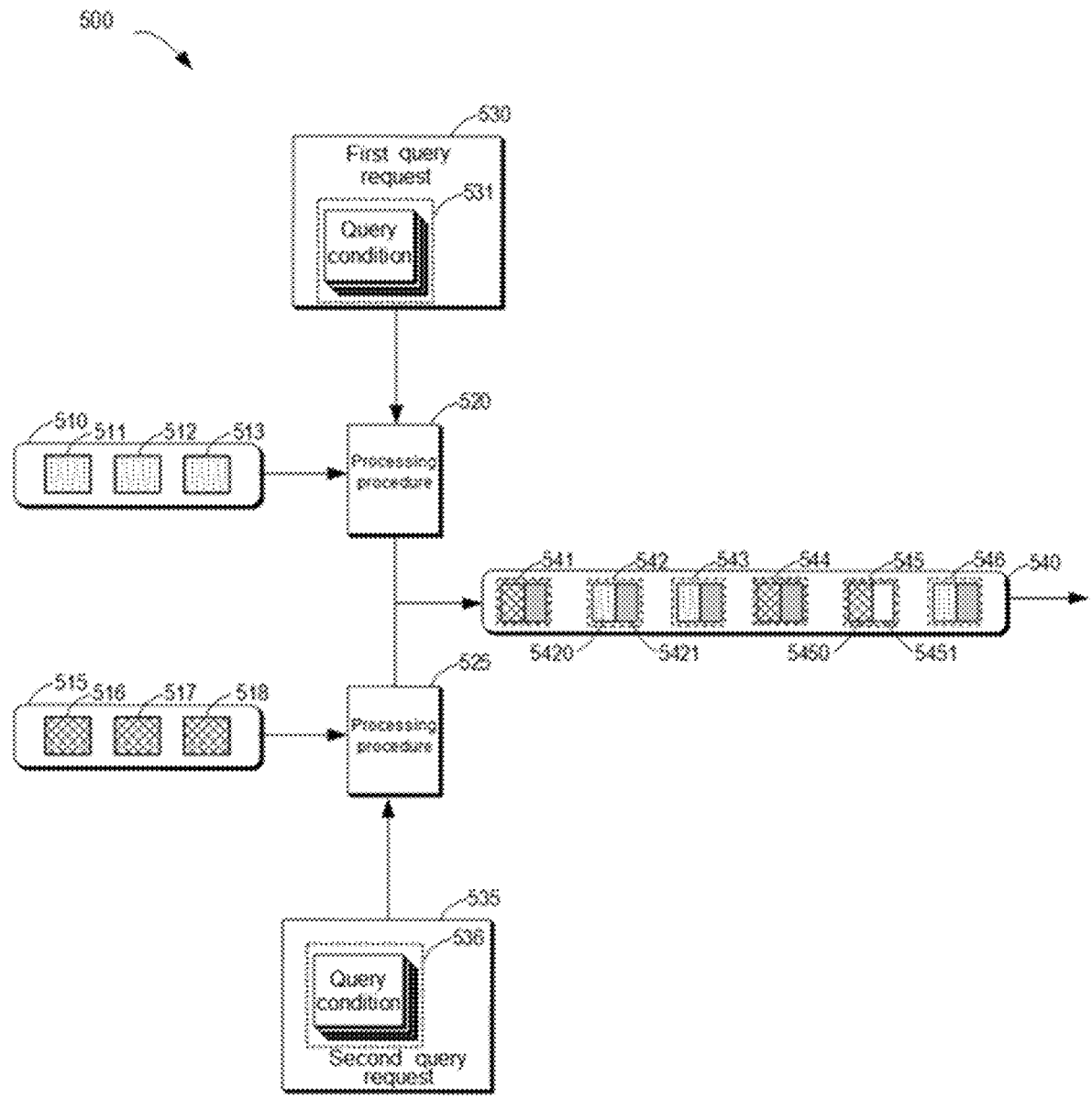
FIG. 5 shows a schematic diagram of a process of processing a plurality of input data streams according to an embodiment of the present disclosure.

FIG. 5 shows a schematic diagram of a process of processing a plurality of input data streams according to an embodiment of the present disclosure. Process 500 may be implemented in computing device 105 as shown in FIG. 1.

As shown in the figure, computing device 105 may receive first input data stream 510 from a first data source and second input data stream 515 from a second data source. The first data source is different from the second data source, and first input data stream 510 is different from second input data stream 515. As an example, first input data stream 510 may include a data stream of the website access events as given in Table 1 above, and second input data stream 515 may include a data stream of mail gateway events as given in Table 2 below. Of course, this is only an example. According to specific application scenarios, first input data stream 510 and second input data stream 515 may include any suitable data streams to be processed.

TABLE 2

| Event ID | Server | Client IP | Mailbox name | Time stamp | Mail category |
|---|---|---|---|---|---|
| 1' | Shanghai | 10.2.26.22 | aa@bb.com | 04/19/2019 09:39:12 | Phishing |
| 2' | Beijing | 10.2.26.49 | ab@bb.com | 04/19/2019 10:14:57 | Virus |
| 3' | Shanghai | 10.2.26.48 | aaa@bb.com | 04/19/2019 10:15:25 | Normal |
| 4' | Beijing | 10.2.26.49 | ac@bb.com | 04/19/2019 10:16:51 | Phishing |
| 5' | Beijing | 10.2.26.68 | aa@bb.com | 04/19/2019 10:18:05 | Normal |
| 6' | Beijing | 10.2.26.49 | ab@bb.com | 04/19/2019 10:21:17 | Virus |

As an example, only 6 events in data stream 515 are listed in Table 2, but it will be understood that it may include events in any number. For each event, the example of Table 1 has 6 fields and corresponding record data, but it will be understood that fields in any number may be included. It will be understood that, for ease of description, FIG. 5 only schematically shows the processing of the first three input data items 511-513 in the data stream shown in Table 1, and the processing of the first three input data items 516-518 in the data stream shown in Table 2. The similar processing may be applied to other input data items.

Computing device 105 may execute processing procedure 520 and processing procedure 525 at the same time. Processing procedure 520 is a process of determining data labels for input data items in input data stream 510, in response to query request 530. Input data stream 510 in FIG. 5 is the same as input data stream 410 previously described with reference to FIG. 4, and input data stream 510, input data items 511-513, query requests 530, and corresponding query conditions are all similar to the corresponding items described in FIG. 4, so the process of determining the data labels is similar, and will not be repeated here.

For example, for input data item 511 (Event 1), corresponding output data item 542 may include data label 5421 "Malicious" and data 5420 the same as input data item 413. Thus, the first output data items 542, 543, and 546 included in the acquired first output data stream may be expressed as <Event 1, "Malicious">, <Event 2, "Malicious">, and <Event 3, "Malicious">, respectively.

In response to second query request 535 for second input data stream 515, computing device 105 may execute processing procedure 525 to determine a third data label for second input data items 516-518 in second input data stream

515. The third data label indicates a third matching relationship between second input data items 516-518 and third query condition 536 of second query request 535. For example, referring to Table 2 above, if the second query request is "In mail gateway events, a client IP that has received the most malicious emails," the third query condition (and optionally the fourth query condition) may be "Mail category==Phishing" and "Mail category==Virus."

Then, computing device 105 may determine a second output data stream corresponding to second input data stream 515. The second output data stream includes second output data items 541, 544, and 545 corresponding to second input data items 511-513. Each second output data item has a third data label, where the third data label is associated with the data label for first input data items 511-513. Continuing to refer to Table 2 above, for input data item 516 (i.e., Event 1'), by processing procedure 525 similar to processing procedure 420 described with reference to FIG. 4, it can be determined that the third data label is "Malicious." Thus, second output data items 541, 544, and 545 included in the acquired second output data stream may be expressed as <Event 1', "Malicious">, <Event 2', "Malicious">, and <Event 3', Null>.

Next, computing device 105 may merge the second output data stream into the output data stream for determining the query information.

In some embodiments, computing device 105 may sequentially output corresponding output data items according to the sequence in which corresponding input data items in the multiple input data streams are received. For example, computing device 105 first receives data item 516 in second data stream 515 (for example, Event 2, Apr. 19, 2019 09:39:12 in Table 2), then receives data item 511 in first data stream 510 (for example, Event 1, Apr. 19, 2019 09:40:12 in Table 1), and then computing device 105 may first perform processing procedure 525 on data item 516 to add a corresponding data label to generate data item 541, and perform processing procedure 520 on data item 511 to add a corresponding data label to generate data item 542. Thus, output data stream 540 may include data items 541-546 that are output in order, which may be expressed as <Event 1', "Malicious">, <Event 1, "Malicious">, <Event 2, "Malicious">, <Event 2', "Malicious">, <Event 3', Null>, and <Event 3, "Malicious">.

It will be understood that additional data stream processing may be performed on output data stream 540, such as the data stream processing described below with reference to FIG. 6 to FIG. 8, to determine corresponding query information. Therefore, the data stream processing method according to the embodiment of the present disclosure has good flexibility and scalability.

Figure 6:
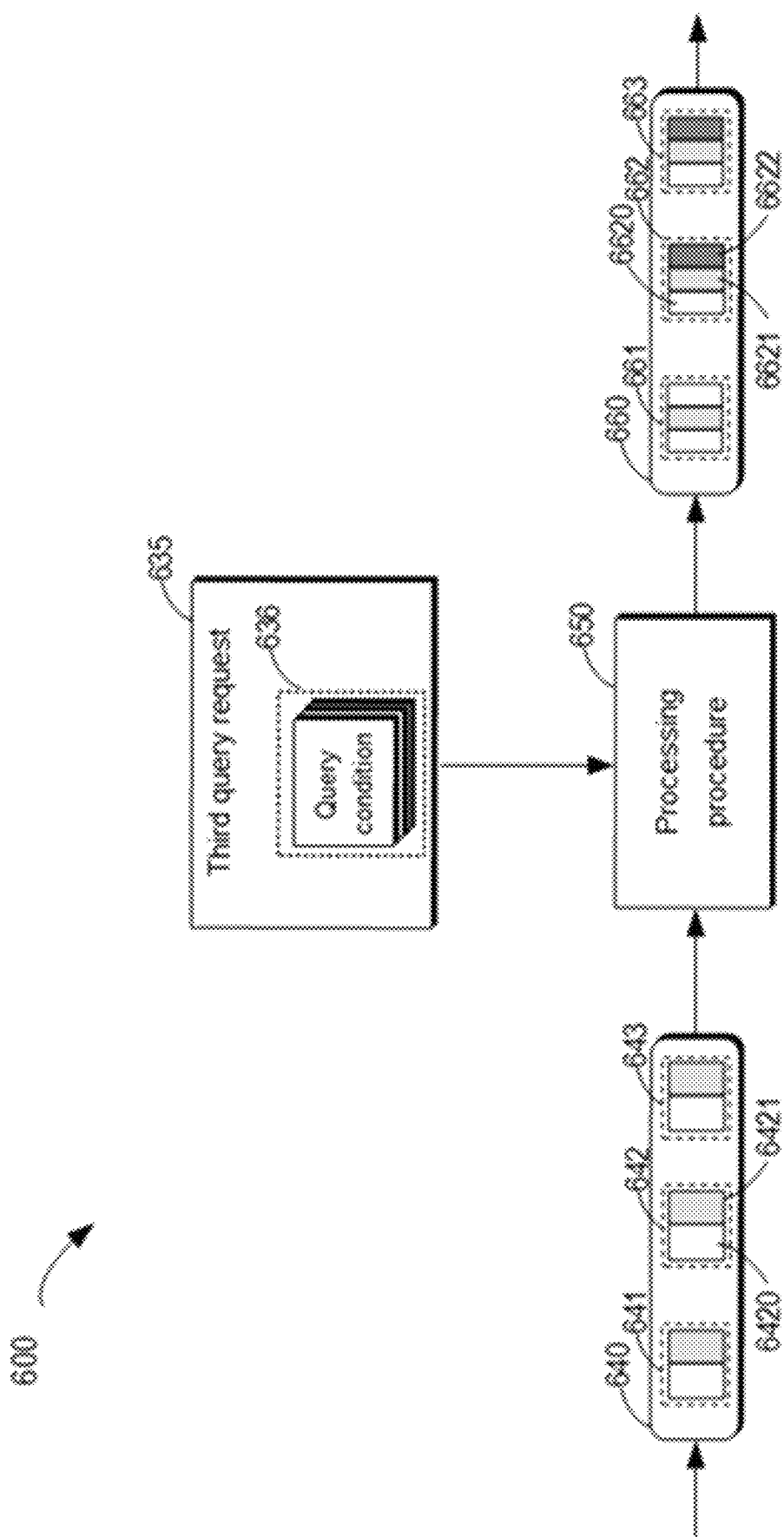
FIG. 6 shows a schematic diagram of another process of processing output data streams according to an embodiment of the present disclosure.

FIG. 6 shows a schematic diagram of another process of processing output data streams according to an embodiment of the present disclosure. For example, process 600 may be implemented in computing device 105 as shown in FIG. 1. It will be understood that output data stream 640 may be any of output data streams 340, 440, and 540 described with reference to FIG. 3 to FIG. 5, or may be an output data stream that has undergone other processing. For ease of understanding, the following describes an example in which output data stream 640 is output data stream 440 in FIG. 4.

Since data processed through processing procedure 420 of FIG. 4 still maintains the form of a data stream, data items therein have a one-to-one correspondence with data items in the (multiple) input data stream(s), therefore, in response to a third query request, computing device 105 may perform processing procedure 650 on output data stream 640 to determine additional data labels.

Continuing to refer to the example given in FIG. 1, output data items 641, 642, and 643 included in output data stream 640 correspond to output data items 441, 442, and 443 in FIG. 4, respectively. Taking output data item 642 as an example, it may include data label 6421 "Malicious" and data 6420 which is the same as the input data item. Therefore, output data items 641, 642, and 643 may be expressed as <Event 1, "Malicious">, <Event 2, "Malicious">, and <Event 3, "Malicious">, respectively.

If third query request 635 is "In webpage access events, a client IP that has accessed the dangerous website 'www.abc.com'," then query condition 636 may be "Domain name==www.abc.com." For example, for output data item 642, through processing procedure 650, computing device 105 may determine that the matching relationship between output data item 642 and query condition 636 is a match, and further determine that additional data label 6622 for output data item 642 is "Dangerous website," so that resulting data item 662 may include data 6620 the same as the input data item, data label 6621 "Malicious," and another data label 6622 "Dangerous website." Therefore, data stream 660 including data items 661, 662, and 663 may be generated. Data items 661, 662, and 663 may be expressed as <Event 1, "Malicious," Null>, <Event 2, "Malicious," "Dangerous website">, and <Event 3, "Malicious," "Dangerous website">, respectively.

It will be understood that additional data stream processing may be performed on data stream 660, such as the data stream processing described below with reference to FIG. 7 to FIG. 8, to determine corresponding query information.

Figure 7:
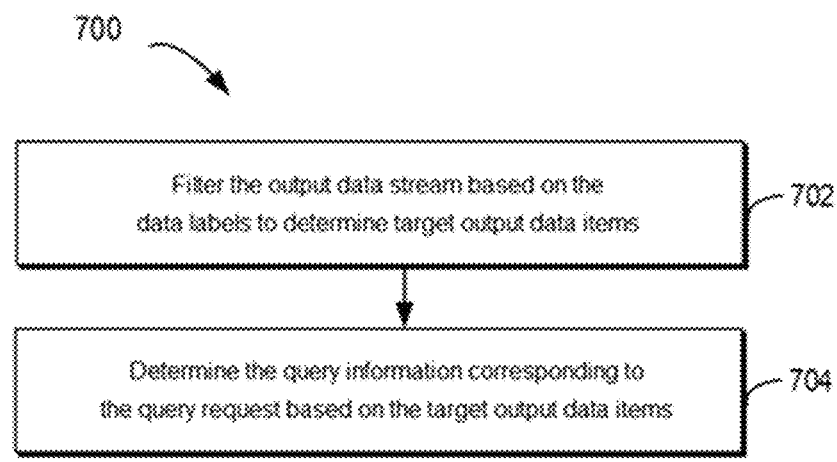
FIG. 7 shows a flowchart of a process of determining query information according to an embodiment of the present disclosure.
Figure 8:
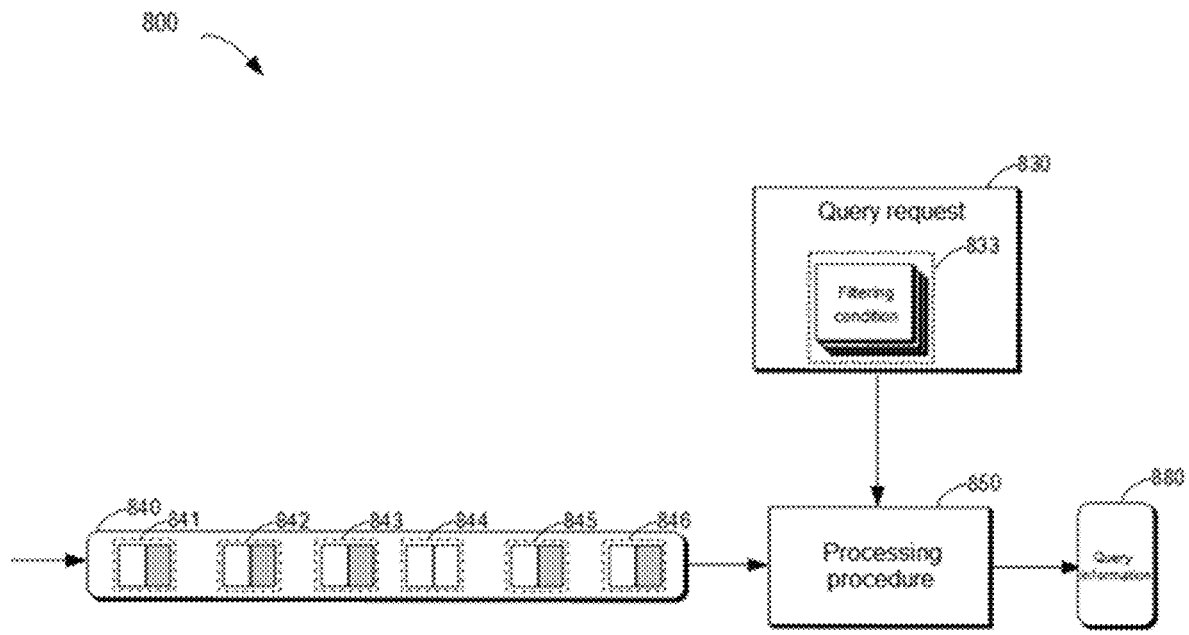
FIG. 8 shows a schematic flowchart of a process of processing output data streams to determine query information according to an embodiment of the present disclosure.

The following will describe how to determine query information corresponding to a query request in conjunction with FIG. 7 and FIG. 8. FIG. 7 shows a flowchart of a process of determining query information according to an embodiment of the present disclosure. FIG. 8 shows a schematic diagram of a process of processing output data streams to determine query information according to an embodiment of the present disclosure. It can be understood that processes 700 and 800 shown in FIG. 7 and FIG. 8 may be implemented in computing device 105 shown in FIG. 1.

Referring to FIG. 7, at 702, computing device 105 may filter the output data stream based on the data labels to determine target output data items.

Specifically, referring to the example given in Table 1 and the schematic diagram shown in FIG. 8, if query request 830 is "A client IP that has accessed malicious webpages the most," the method described with reference to FIG. 2 to FIG. 6 may be used to determine the data labels for various input data items so as to generate output data stream 840.

For example, output data stream 840 may include output data items 841-846, which are respectively <Event 1, "Malicious">, <Event 2, "Malicious">, <Event 3, "Malicious">, <Event 4, "Malicious">, <Event 5, Null>, and <Event 6, "Malicious">. In this case, computing device 105 may perform a filtering operation on output data stream 840 through processing procedure 850 to determine output data items with the "Malicious" data labels, that is, it can be determined that the target output data items are 841-844 and 846.

It is understandable that output data items 841-846 may have two or more labels, for example, have "Virus" and/or "Phishing" and/or "Dangerous website," in which case multiple filter conditions or their logical combinations may be set to determine the target output data items.

Referring back to FIG. 7, at 704, computing device 105 may determine the query information corresponding to the query request based on the target output data items.

Continuing to refer to the example given in Table 1 and the schematic diagram shown in FIG. 8, target output data items are 841-844 and 846. Based on the target output data items, processing procedure 850 including conventional sorting statistical operations may be performed to determine the query information, i.e., 10.2.26.49, corresponding to query request 830.

It is understandable that the above processing procedure 850 may support processing output data stream 540 acquired by processing input data items from multiple data sources as shown in FIG. 5, and processing the output data stream acquired by processing different query conditions of multiple fields as shown in FIG. 6. In this way, the embodiments of the present disclosure may support complex continuous query such as the join query on the data streams in a real-time manner.

Figure 9:
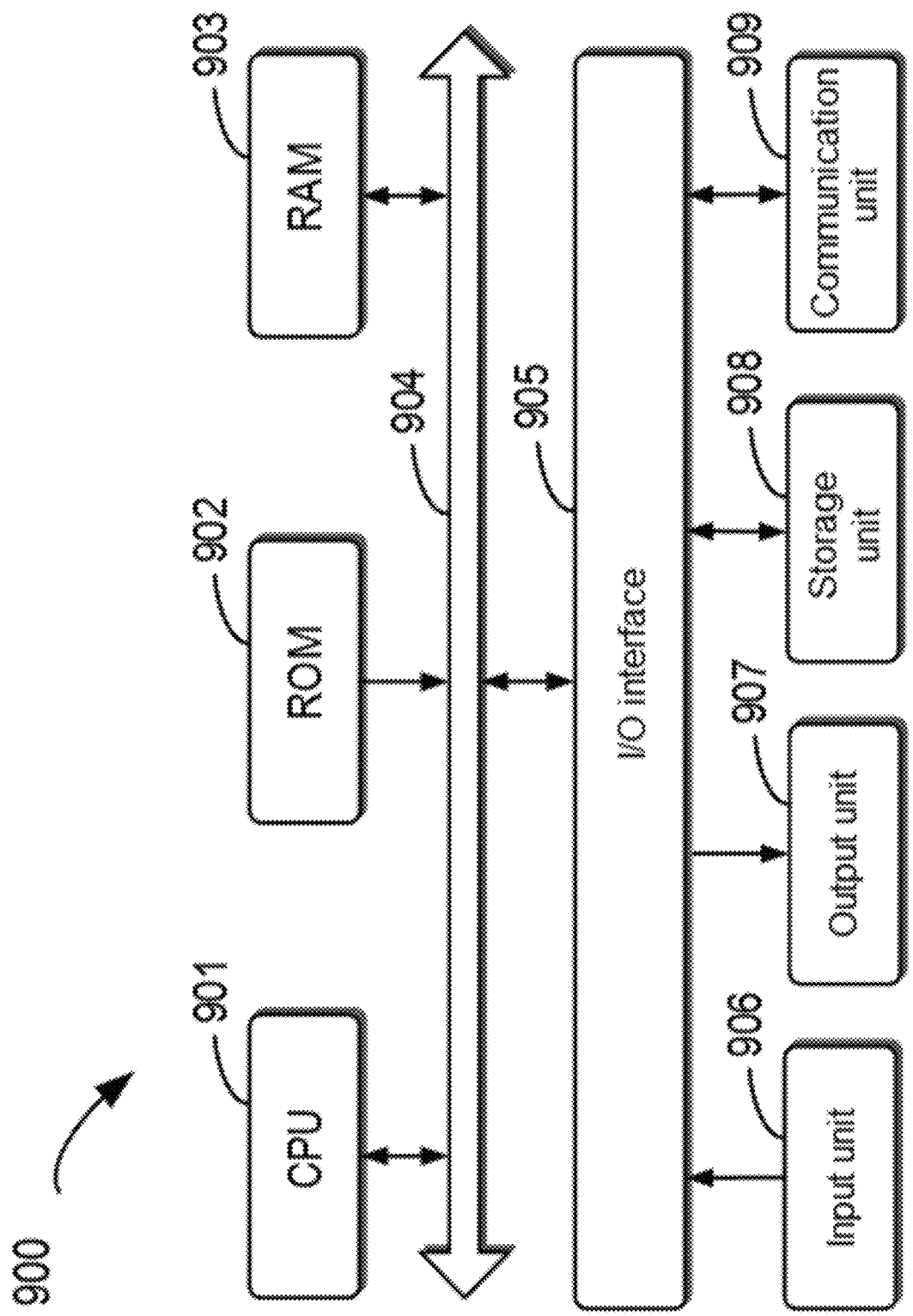
FIG. 9 shows a block diagram of an example device that may be used to implement the embodiments of the present disclosure.

FIG. 9 shows a schematic block diagram of example electronic device 900 that may be used to implement an embodiment of the present disclosure. For example, electronic device 900 may be used to implement computing device 105 as shown in FIG. 1. As shown in the figure, device 900 includes central processing unit (CPU) 901 that may perform various appropriate actions and processing according to a computer program instruction stored in read-only memory (ROM) 902 or a computer program instruction loaded from storage unit 908 into random access memory (RAM) 903. Various programs and data, required by the operation of device 900, may also be stored in RAM 903. CPU 901, ROM 902, and RAM 903 are connected to one another through bus 904. Input/output (I/O) interface 905 is also connected to bus 904.

Multiple components in device 900 are connected to I/O interface 905, including: input unit 906, such as a keyboard and a mouse; output unit 907, such as various types of displays and speakers; storage unit 908, such as a magnetic disk and an optical disk; and communication unit 909, such as a network card, a modem, and a wireless communication transceiver. Communication unit 909 allows device 900 to exchange information/data with other devices through a computer network such as the Internet and/or various telecommunication networks.

Processing unit 901 executes various methods and processing described above, e.g., any one of processes 200 to 800. For example, in some embodiments, any one of processes 200 to 800 may be implemented as a computer software program or a computer program product that is tangibly included in a machine-readable medium, e.g., storage unit 908. In some embodiments, part or all of the computer program may be loaded and/or installed on device 900 via ROM 902 and/or communication unit 909. When the computer program is loaded into RAM 903 and executed by CPU 901, one or more steps of any one of processes 200 and 800 described above may be performed. Alternatively, in other embodiments, CPU 901 may be configured in any other suitable manner (e.g., by means of firmware) to implement any one of processes 200 to 800.

The present disclosure may be a method, a device, a system, and/or a computer program product. The computer program product may include a computer-readable storage medium on which computer-readable program instructions for performing various aspects of the present disclosure are loaded.

The computer-readable storage medium may be a tangible device capable of retaining and storing instructions used by an instruction-executing device. For example, the computer-readable storage medium may be, but is not limited to, an electrical storage device, a magnetic storage device, an optical storage device, an electromagnetic storage device, a semiconductor storage device, any non-transitory storage device, or any appropriate combination of the above. More specific examples (a non-exhaustive list) of computer-readable storage media include: a portable computer disk, a hard disk, a random access memory (RAM), a read-only memory (ROM), an erasable programmable read-only memory (EPROM or a flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. Computer-readable storage media used herein are not to be interpreted as transient signals per se, such as radio waves or other freely propagating electromagnetic waves, electromagnetic waves propagating through waveguides or other transmission media (for example, light pulses through fiber optic cables), or electrical signals transmitted via electrical wires.

The computer-readable program instructions described herein can be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. The network adapter card or network interface in each computing/processing device receives computer-readable program instructions from the network and forwards the computer-readable program instructions for storage in a computer-readable storage medium in each computing/processing device.

Computer program instructions for performing the operations of the present disclosure may be assembly instructions, instruction set architecture (ISA) instructions, machine instructions, machine-related instructions, microcode, firmware instructions, state setting data, or source or object code written in any combination of one or more programming languages, wherein the programming languages include object-oriented programming languages, such as Smalltalk and C++, and conventional procedural programming languages, such as the "C" language or similar programming languages. Computer-readable program instructions may be executed entirely on a user's computer, partly on a user's computer, as a stand-alone software package, partly on a user's computer and partly on a remote computer, or entirely on a remote computer or a server. In the case involving a remote computer, the remote computer can be connected to a user's computer through any kind of network, including a local area network (LAN) or a wide area network (WAN), or it can be connected to an external computer (for example, connected through the Internet using an Internet service provider). In some embodiments, an electronic circuit, for example, a programmable logic circuit, a field programmable gate array (FPGA), or a programmable logic array (PLA), is personalized by utilizing state information of the computer-readable program instructions, wherein the electronic circuit may execute computer-readable program instructions so as to implement various aspects of the present disclosure.

Various aspects of the present disclosure are described herein with reference to flowcharts and/or block diagrams of the method, the apparatus (system), and the computer program product according to embodiments of the present disclosure. It should be understood that each block in the flowcharts and/or block diagrams as well as a combination of blocks in the flowcharts and/or block diagrams may be implemented by using the computer-readable program instructions.

These computer-readable program instructions can be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing the functions/actions specified in one or more blocks in the flowcharts and/or block diagrams. These computer-readable program instructions may also be stored in a computer-readable storage medium, and these instructions cause a computer, a programmable data processing apparatus, and/or other devices to work in a specific manner; and thus the computer-readable medium having stored instructions includes an article of manufacture including instructions that implement various aspects of the functions/actions specified in one or more blocks in the flowcharts and/or block diagrams.

The computer-readable program instructions can also be loaded onto a computer, a further programmable data processing apparatus, or a further device, so that a series of operating steps can be performed on the computer, the further programmable data processing apparatus, or the further device to produce a computer-implemented process, such that the instructions executed on the computer, the further programmable data processing apparatus, or the further device can implement the functions/actions specified in one or more blocks in the flowcharts and/or block diagrams.

The flowcharts and block diagrams in the drawings illustrate the architectures, functions, and operations of possible implementations of the systems, methods, and computer program products according to various embodiments of the present disclosure. In this regard, each block in the flowcharts or block diagrams may represent a module, a program segment, or part of an instruction, the module, the program segment, or the part of an instruction including one or more executable instructions for implementing specified logical functions. In some alternative implementations, the functions marked in the blocks may also occur in an order different from that marked in the accompanying drawings. For example, two successive blocks may actually be executed in parallel substantially, or they may be executed in an opposite order sometimes, depending on the functions involved. It also should be noted that each block in the block diagrams and/or flowcharts and a combination of blocks in the block diagrams and/or flowcharts may be implemented using a dedicated hardware-based system for executing specified functions or actions, or may be implemented using a combination of dedicated hardware and computer instructions.

Various implementations of the present disclosure have been described above. The foregoing description is illustrative rather than exhaustive, and is not limited to the disclosed implementations. Numerous modifications and changes are apparent to those of ordinary skill in the art without departing from the scope and spirit of the various illustrated implementations. The selection of terms as used herein is intended to best explain the principles and practical applications of the various implementations or technical improvements of technologies on the market, or to enable other persons of ordinary skill in the art to understand the implementations disclosed herein.

What is claimed is:

1. A method, comprising:
    in response to receiving a registration of a complex continuous query request on an input data stream, continuously determining, by a system comprising a processor, as input data items in the input data stream are received, data labels for the input data items, wherein the data labels indicate at least respective first matching relationships between the input data items and a first query condition of the complex continuous query request;
    continuously generating, by the system, as the input data items in the input data stream are received, an output data stream corresponding to the input data stream, wherein the output data stream comprises output data items corresponding to the input data items, and each output data item having the data label of a corresponding input data item; and
    continuously generating, by the system, as the input data items in the input data stream are received, query information comprising query results responding to the complex continuous query request based on the output data stream.

2. The method according to claim 1, wherein the continuously determining the data labels comprises:
    determining a first query field corresponding to the complex continuous query request;
    acquiring first record data, corresponding to the first query field, in the input data item; and
    determining the first matching relationship for the first record data and the first query condition.

3. The method according to claim 2, wherein the continuously determining the data labels further comprises:
    determining a second query condition and a second query field corresponding to the complex continuous query request, the second query condition being different from the first query condition;
    acquiring second record data, corresponding to the second query field, in the input data item;
    determining a second matching relationship between the input data item and the second query condition based on the second record data and the second query condition; and
    determining the data label indicating the first matching relationship and the second matching relationship.

4. The method according to claim 1, wherein the continuously generating the query information comprises:
    filtering the output data stream based on the data labels to determine a target output data item; and
    determining the query information corresponding to the query request based on the target output data item.

5. The method according to claim 1, further comprising:
    in response to receiving an additional registration of an additional complex continuous query request on an additional input data stream, continuously determining, by the system, as additional input data items in the additional input data stream are received, additional data labels for the additional input data items, wherein the additional data labels indicate at least third matching relationships between the additional input data items and an additional query condition of the additional complex continuous query request;
    continuously generating, by the system, as the additional input data items in the additional input data stream are received, an additional output data stream corresponding to the additional input data stream, wherein the additional output data stream comprises additional output data items corresponding to the additional input data items, and each additional output data item having the additional data label, wherein the additional data label is associated with the additional data label of a corresponding additional input data item; and continuously merging, by the system, as the additional input data items in the additional input data stream are received, the additional output data stream into the output data stream to determine the query information.

6. The method according to claim 1, wherein the output data items further comprise record data in the input data items, and the record data is associated with the query information.

7. The method according to claim 1, wherein the output data items further comprise the input data items.

8. A device, comprising:
a processor; and
a memory coupled to the processor and having instructions stored therein, wherein the instructions, when executed by the processor, cause the device to execute operations, and the operations comprise:
in response to a receiving a registration of a complex continuous query request on an input data stream, continuously determining, as input data items in the input data stream are received, data labels for the input data items, wherein the data labels indicate at least respective first matching relationships between the input data items and a first query condition of the complex continuous query request;
continuously generating, as the input data items in the input data stream are received, an output data stream corresponding to the input data stream, wherein the output data stream comprises output data items corresponding to the input data items, and each output data item having the data label of a corresponding input data item; and
continuously generating, as the input data items in the input data stream are received, query information comprising query results responding to the complex continuous query request based on the output data stream.

9. The device according to claim 8, wherein the continuously determining the data labels comprises:
determining a first query field corresponding to the complex continuous query request;
acquiring first record data, corresponding to the first query field, in the input data item; and
determining the first matching relationship for the first record data and the first query condition.

10. The device according to claim 9, wherein the continuously determining the data labels further comprises:
determining a second query condition and a second query field corresponding to the complex continuous query request, the second query condition being different from the first query condition;
acquiring second record data, corresponding to the second query field, in the input data item;
determining a second matching relationship between the input data item and the second query condition based on the second record data and the second query condition; and
determining the data label indicating the first matching relationship and the second matching relationship.

11. The device according to claim 8, wherein the continuously generating the query information comprises:

filtering the output data stream based on the data labels to determine a target output data item; and
determining the query information corresponding to the query request based on the target output data item.

12. The device according to claim 8, wherein the operations further comprise:
in response to receiving an additional registration of an additional complex continuous query request on an additional input data stream, continuously determining, as additional input data items in the additional input data stream are received, additional data labels for the additional input data items, wherein the additional data labels indicate at least respective third matching relationships between the additional input data items and an additional query condition of the additional complex continuous query request;
continuously generating, as the additional input data items in the additional input data stream are received, an additional output data stream corresponding to the additional input data stream, wherein the additional output data stream comprises additional output data items corresponding to the additional input data items, and each additional output data item having the additional data label, wherein the additional data label is associated with the additional data label of a corresponding additional input data item; and
continuously merging, as the additional input data items in the additional input data stream are received, the additional output data stream into the output data stream to determine the query information.

13. The device according to claim 8, wherein the output data items further comprise record data in the input data items, and the record data is associated with the query information.

14. The device according to claim 8, wherein the output data items further comprise the input data items.

15. A computer program product stored on a non-transitory computer-readable medium and comprising machine-executable instructions, wherein the machine-executable instructions, when executed, cause a machine to perform operations, comprising:
in response to a receiving a registration of a complex continuous query request on an input data stream, continuously determining, as input data items in the input data stream are received, data labels for the input data items, wherein the data labels indicate at least respective first matching relationships between the input data items and a first query condition of the complex continuous query request;
continuously generating, as the input data items in the input data stream are received, an output data stream corresponding to the input data stream, wherein the output data stream comprises output data items corresponding to the input data items, and each output data item having the data label of a corresponding input data item; and
continuously generating, as the input data items in the input data stream are received, query information comprising query results responding to the complex continuous query request based on the output data stream.

16. The computer program product according to claim 15, wherein the continuously determining the data labels comprises:
determining a first query field corresponding to the complex continuous query request;
acquiring first record data, corresponding to the first query field, in the input data item; and determining the first matching relationship for the first record data and the first query condition.

17. The computer program product according to claim 15, wherein the continuously determining the data labels further comprises:
   determining a second query condition and a second query field corresponding to the complex continuous query request, the second query condition being different from the first query condition;
   acquiring second record data, corresponding to the second query field, in the input data item;
   determining a second matching relationship between the input data item and the second query condition based on the second record data and the second query condition; and
   determining the data label indicating the first matching relationship and the second matching relationship.

18. The computer program product according to claim 15, wherein the continuously generating the query information comprises:
   filtering the output data stream based on the data labels to determine a target output data item; and
   determining the query information corresponding to the query request based on the target output data item.

19. The computer program product according to claim 15, wherein the operations further comprise:
   in response to receiving an additional registration of an additional complex continuous query request on an additional input data stream, continuously determining, as additional input data items in the additional input data stream are received, additional data labels for the additional input data items, wherein the additional data labels indicate at least respective third matching relationships between the additional input data items and an additional query condition of the additional complex continuous query request;
   continuously generating, as the additional input data items in the additional input data stream are received, an additional output data stream corresponding to the additional input data stream, wherein the additional output data stream comprises additional output data items corresponding to the additional input data items, and each additional output data item having the additional data label, wherein the additional data label is associated with the additional data label of a corresponding additional input data item; and
   continuously merging, as the additional input data items in the additional input data stream are received, the additional output data stream into the output data stream to determine the query information.

20. The computer program product according to claim 15, wherein the output data items further comprise at least one of record data, in the input data items, associated with the query information, or the input data items.

* * * * *